M. B. COVERT.
FRICTIONAL POWER TRANSMISSION MECHANISM.
APPLICATION FILED JULY 26, 1909.
990,844.
Patented May 2, 1911.
2 SHEETS—SHEET 1.
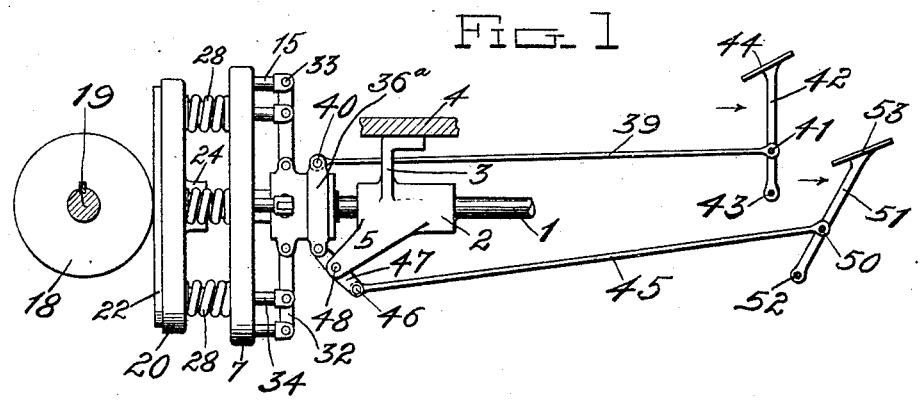
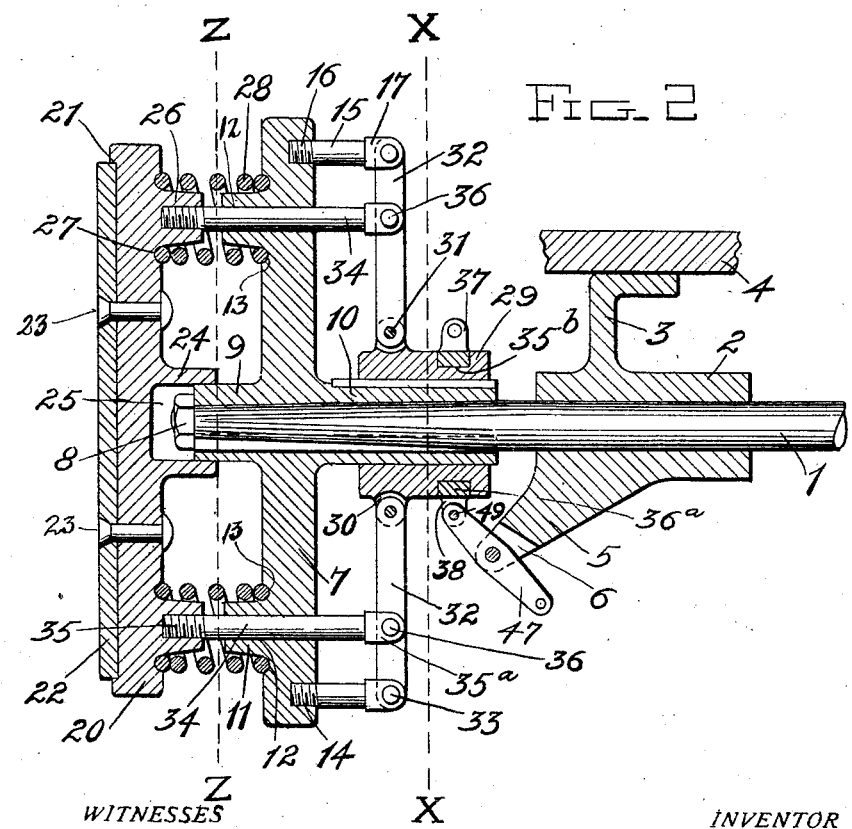
WITNESSES
INVENTOR
Martin B. Covert
A. W. Wilson Attorney M. B. COVERT.
FRICTIONAL POWER TRANSMISSION MECHANISM.
APPLICATION FILED JULY 26, 1909.
990,844.
Patented May 2, 1911.
2 SHEETS—SHEET 2.
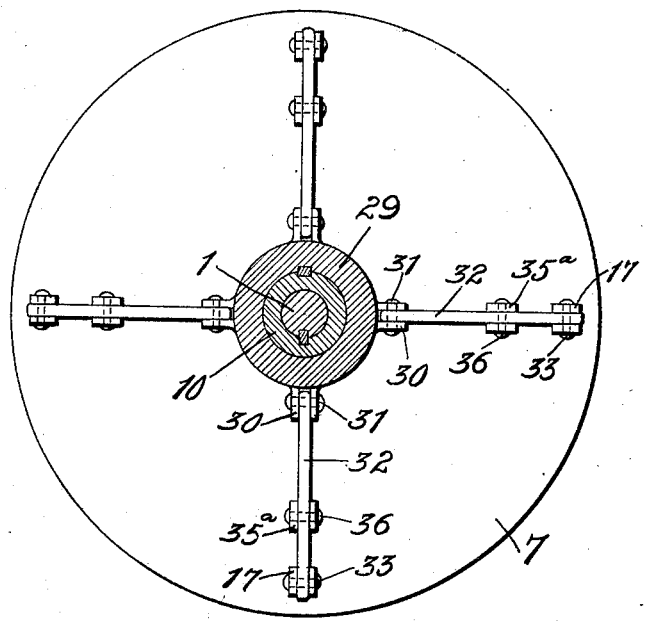
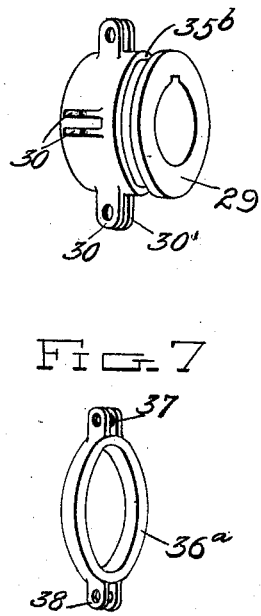
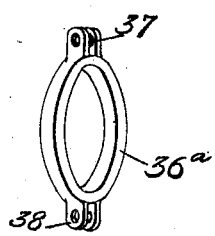
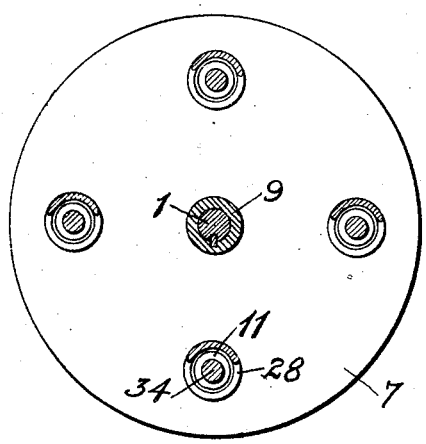
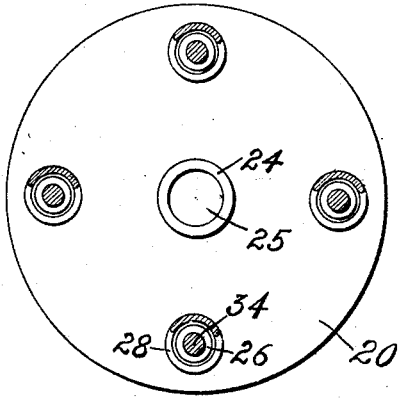
WITNESSES
INVENTOR
Martin B. Covert
by N. M. Wilson Attorney

UNITED STATES PATENT OFFICE.

MARTIN B. COVERT, OF DETROIT, MICHIGAN.

FRICTIONAL POWER-TRANSMISSION MECHANISM.

990,844.                  Specification of Letters Patent.      Patented May 2, 1911.

Application filed July 26, 1909.   Serial No. 509,650.

*To all whom it may concern:*

Be it known that I, MARTIN B. COVERT, a citizen of the United States, residing at Detroit, in the county of Wayne and State of Michigan, have invented certain new and useful Improvements in Frictional Power-Transmission Mechanism, of which the following is a specification.

This invention relates to a frictional power transmission mechanism designed primarily for use in connection with motor vehicles, but it is to be understood that a power transmission mechanism in accordance with this invention is adapted not only for use in connection with motor vehicles, but for any other purposes wherein it is found applicable, and the object of the invention is to provide in a manner as hereinafter set forth a power transmission mechanism with means for quickly and conveniently separating the driving element from the driven element to discontinue transmission; to provide the mechanism with means in a manner as hereinafter set forth for automatically throwing and maintaining the driving element in operative relation with respect to the driven element, said means furthermore constituting a sound-deadening medium so as to reduce noises to a minimum during the operation of the mechanism, and to furthermore provide the mechanism with means for increasing the friction or the bite between the driven element and the driving element so as to prevent slipping or skidding of the driven element with respect to the driving element during the operation of the mechanism.

Further objects of the invention are to provide a frictional power transmission mechanism which shall be simple in its construction and arrangement, strong, durable, efficient in its use, conveniently operated to discontinue transmission or to increase the friction between the driving and driven element, readily set up in position for use, and comparatively inexpensive to manufacture.

With the foregoing and other objects in view, the invention consists of the novel construction, combination and arrangement of parts as hereinafter more specifically described and illustrated in the accompanying drawings, wherein is shown the preferred embodiment of the invention but it is to be understood that changes, variations and modifications can be resorted to which come within the scope of the claims hereunto appended.

In the drawings wherein like reference characters denote corresponding parts throughout the several views: Figure 1 is a side elevation of a frictional power transmission mechanism in accordance with this invention. Fig. 2 is a vertical sectional view of the driving element and fly wheel, forming parts of the mechanism, and further showing the connections between said element and the fly wheel. Fig. 3 is an enlarged view looking toward one face of the fly wheel. Fig. 4 is a view looking toward the other face of the fly wheel on a somewhat reduced scale. Fig. 5 is a view looking toward one face of the driving element on a scale somewhat larger than that shown in Fig. 1, and, Figs. 6 and 7 are details illustrating respectively the shiftable sleeve and a supporting collar both forming parts of the mechanism. A frictional power transmission mechanism in accordance with this invention comprises the fly wheel of a prime mover, a driven element, a driving element, resilient pressure exerting devices for maintaining the driving element in engagement with the driven element, said pressure exerting devices furthermore constituting a sound-deadening medium, a shiftable coupling mechanism for permanently connecting the driving element with the fly wheel, means for operating the coupling mechanism in one direction to separate the driving element from the driven element, and means for operating the coupling mechanism in the opposite direction to increase the friction or "bite" between the driven and driving elements so as to prevent slipping or skidding of the driven element with respect to the driving element.

Referring to the drawings in detail, 1 denotes the shaft of a prime mover (not shown) and which extends through a sleeve 2 connected by a bracket 3 to a support 4. The latter may be the frame of a motor vehicle. The sleeve 2 is provided with a laterally extending arm 5 which is bifurcated as at 6.

*Fly wheel.*—The fly wheel of the prime mover is indicated by the reference character 7 and is connected by the hold-fast devices 8 to the shaft 1. The fly wheel 7 is secured to one end of the shaft 1 and is provided with an elongated hub 9. The latter projects from each side of the web of the wheel 7, but is longer at one side than at the other, said elongation being indicated by the reference character 10. One face of the fly wheel 7 is formed with a circumferentially extending series of bosses 11 positioned at a point removed from the perimeter of the wheel and the latter is further provided with a circumferentially extending series of openings 12 which extend through the web of the wheel and the bosses 11. Surrounding the inner terminus of each of the bosses is an annular groove semi-cylindrical in contour, each of the grooves being indicated by the reference character 13 and constituting a seat for a purpose to be hereinafter referred to. The opposite face of the wheel 7 is formed with a series of circumferentially extending screw-threaded sockets 14 arranged in proximity to the edge of the wheel and secured in each of the said sockets is a forwardly extending arm 15 having a screw-threaded inner end 16 for engagement with the threads of the socket. Each of the arms 15 is formed with a bifurcated forward end as at 17, the function of which will be hereinafter referred to.

*Driven element.*—The driven element consists of a friction disk 18 of any suitable material and which is mounted upon a counter or jack shaft 19 and is adapted to be engaged by the driving element whereby said disk 18 will be revolved and transmit motion to the counter or jack shaft 19, the latter in turn transmitting motion to the point desired by a suitable connection (not shown).

*Driving element.*—The driving element consists of an annular body portion 20 of any suitable material, preferably cast iron, having one face thereof provided with a circular recess 21 in which is seated a friction disk 22 of any suitable material, preferably aluminum, and which extends at right angles with respect to the disk 18. The disk 22 is fixedly secured to the body portion 20 by the hold-fast devices 23, said devices being counter-sunk in the disk 22. The disk 22 is adapted to engage the disk 18 for transmitting motion thereto. The other face of the body portion 20 centrally thereof is provided with an annular collar 24 which forms a socket 25 into which extends one side of the hub 9, the diameter of the socket 25 with respect to the diameter of the hub 9 is such as to allow of the collar 24 shifting upon the hub 9 when the driving element is shifted toward and away from the fly wheel by the means hereinafter referred to. That face of the body portion 20 of the driving element which is provided with the collar 24 is furthermore provided with a circumferentially extending series of screw-threaded protuberances 26 which constitute sockets for a purpose to be hereinafter referred to. The protuberances 26 oppose the bosses 11 of the fly wheel and surrounding the inner terminus of each of the protuberances 26 is a semi-cylindrical annular groove 27 forming a seat for a purpose to be hereinafter referred to.

*Resilient pressure exerting devices.*—The function of these devices is for maintaining the driving element in engagement with the driven element so as to transmit motion to the driven element, such devices further constituting means for automatically returning the driving element to engagement with the driven element after the said elements have been separated and further constituting a yieldable means to deaden the sound during the operation of the driven element by the driving element. The said pressure exerting devices consist of a circumferentially extending series of coiled springs 28 capable of expanding and contracting, the springs being under a state of compression when the driving element is withdrawn from operative engagement with the driven element and when the driving element is released the expansion of the springs will automatically shift the driving element in engagement with the driven element and the springs will furthermore maintain the two elements in frictional engagement so that during the rotation of the driving element motion will be transmitted to the driven element. Each of the springs 28 surrounds a boss 11 and a protuberance 26 which opposes the boss and one end of each of the springs 28 is seated in a groove 13 in the fly wheel and the other end of the spring is seated in a groove 27 in the body portion 20 of the driving element. The bosses 11 and protuberances 26 form supporting means for the springs 28 and the grooves 13 and 27 constitute seats for the ends of the springs.

*Shiftable coupling mechanism.*—The function of this mechanism is to permanently couple the driving element with the fly wheel, so that when the fly wheel is driven by the engine shaft 1, the driving element will be carried with the fly wheel. A further function of said mechanism is, that when operating in one direction it will shift the driving element longitudinally and toward the fly wheel to move said driving element out of engagement with the driven element to discontinue the operation of the driven element, the shifting of the driving element from the driven element being had against the action of the springs 28, so, that when the actuating means which shifts the coupling mechanism is released, the springs 28 will automatically expand and shift the driving element to engagement with the driven element. The said shiftable coupling mechanism comprises a longitudinally slidable sleeve 29 keyed upon the elongated portion 10 of the hub 9 and which is movable toward and away from the fly wheel to cause the shifting of the coupling mechanism in the direction desired. The sleeve 29 is formed with four pairs of apertured ears 30, the pairs of ears are equally spaced with respect to each other throughout the periphery of the sleeve 29 and in proximity to the inner end thereof. Pivotally connected as at 31 to each pair of ears 30 is the inner end of a laterally extending link 32, the outer end of said link being pivotally connected as at 33 to the bifurcated end 17 of a forwardly extending arm 15. Secured in each of the screw-threaded sockets formed by the protuberances 26 is a forwardly extending shift bar 34, each of said bars having the rear end thereof screw-threaded as at 35 for engagement in the screw-threaded sockets formed by the said protuberances 26. The bars 34 extend through the openings 13 in the fly wheel 7 and each has its forward end provided with a pair of apertured ears 35$^a$ to which is pivotally connected as at 36 a link 32. From the foregoing arrangement and construction of parts, it is evident that if the sleeve 29 is shifted in a direction away from the fly wheel 7, the inner ends of the links 32 will be carried therewith, thereby shifting the bars 34 forwardly, these latter moving the driving element toward the fly wheel 7 and increase the tension of the springs 28, such operation shifting the driving element out of engagement with the driven element. When the sleeve 29 is released the springs 28 will expand and thereby shift the driving element to engagement with the driven element. If the sleeve 29 is shifted toward the fly wheel 7, the inner ends of the links 32 will be carried toward the fly wheel 7, the links rocking upon their pivots 33 as is evident. Such movement of the sleeve 29 shifting the links 32 in the manner as stated will move the bars 34 rearwardly, these latter in turn carrying the driven element in the same direction and thereby increasing the friction or "bite" between the driving element and the driven element so as to prevent slipping or skidding of the driven element with respect to the driving element during the rotation of the latter. The means for shifting the sleeve 29 in the direction stated will presently be described. The sleeve 29 near its forward end is provided with an annular groove 35$^b$ in which is seated a band or ring 36$^a$ provided with two pairs of apertured lugs 37, 38, the pair of lugs 37 being arranged diametrically opposite the other pair of apertured lugs 38. The band or ring 36$^a$ combined with the lugs 37 constitutes an attaching means for the shifting means for the sleeve.

*Means for shifting the coupling mechanism to move the driving element out of engagement with the driven element.* — The said means consists of an elongated shifting rod 39 which is pivotally connected at its inner end as at 40 to the lugs 37 and at its outer end is pivotally connected as at 41 to a foot operated lever 42, the latter being pivoted at its lower end as at 43 to a suitable support and at its upper end provided with a foot tread 44 which extends at an inclination. By the foregoing arrangement of parts, it is evident that if the lever 42 be shifted from its vertical position in the direction of the arrow, the sleeve 29 will be shifted forwardly on the elongated portion of the hub 10 and owing to the connection described between the sleeve, the fly wheel and driving element, move the driving element from engagement with the driven element thereby discontinuing the operation of said element. When pressure upon the foot lever 42 is relieved, the springs 28 will expand, the springs being under a state of tension when the driving element is shifted toward the fly wheel and will automatically move the driving element to engagement with the driven element.

*Means for shifting the coupling mechanism to increase the friction between the driving and driven elements.* — At certain times it has been found that when traveling over heavy roads the power of the springs 28 is not sufficient to maintain a frictional driving engagement between the driving element and the driven element causing a slipping or skidding of the driven element with respect to the driving element during the operation of the latter, therefore, this last mentioned means is utilized to operate the coupling mechanism between the driving element and the driven element so as to increase the friction or "bite" between the driven element and the driving element to prevent any possibility of slipping or skidding of the driven element with respect to the driving element during the operation of the latter element. The said means comprises a normally inclined shifting bar 45 which is pivoted at its inner end as at 46 to one arm of a lever 47 pivoted as at 48 in the bifurcated end 6 of the laterally extending arm 5. The other arm of the lever 47 is pivotally connected as at 49 to the pair of apertured ears 38. The forward end of the shifting bar 45 is pivotally connected as at 50 to a normally and forwardly inclined foot-lever 51. The lower end of the lever 51 is pivoted as at 52 to a suitable support and the upper end of the said lever 51 is provided with a foot-tread 53 which extends at an inclination. Owing to the foregoing arrangement of parts, it is evident that when the lever 51 is shifted forwardly in the direction of the arrow that the sleeve 29 will be shifted toward the fly wheel 7 and owing to the connections between the sleeve 29, fly wheel 7 and driving element, the latter element will be forced against the driven element to increase the friction or the "bite" between the driven element and the driving element thereby overcoming any likelihood of slipping or skidding of the driven element with respect to the driving element when the latter is revolved. After passing through the heavy portion of the road, the lever 51 is released and the springs 28 maintain the driving element in frictional driving engagement with the driven element.

What I claim is:

1. A frictional power transmission mechanism comprising a rotatable driven element, a fly wheel operated from a prime mover, a driving element adapted to frictionally engage the driven element for operating it, a pressure exerting means interposed between the driving element and the fly wheel for maintaining the driving element in frictional engagement with the driven element, and a shiftable coupling mechanism for permanently connecting the driving element and fly wheel together whereby said element and fly wheel will revolve in unison.

2. A frictional power transmission mechanism comprising a rotatable driven element, a fly wheel operated from a prime mover, a driving element adapted to frictionally engage the driven element for operating it, a pressure exerting means interposed between the driving element and the fly wheel for maintaining the driving element in frictional engagement with the driven element, a shiftable coupling mechanism for permanently connecting the driving element and fly wheel together whereby said element and fly wheel will revolve in unison, and means for actuating said coupling mechanism for shifting the driving element out of frictional engagement with the driven element and against the action of said pressure exerting means.

3. A frictional power transmission mechanism comprising a rotatable driven element, a fly wheel operated from a prime mover, a driving element adapted to frictionally engage the driven element for operating it, a pressure exerting means interposed between the driving element and the fly wheel for maintaining the driving element in frictional engagement with the driven element, a shiftable coupling mechanism for permanently connecting the driving element and fly wheel together whereby said element and fly wheel will revolve in unison, and means for actuating said coupling mechanism for shifting the driving element to increase the frictional engagement or bite between the driven element and the driving element to prevent slipping or skidding of the driven element with respect to the driving element.

4. A frictional power transmission mechanism comprising a rotatable driven element, a fly wheel operated from a prime mover, a driving element adapted to frictionally engage the driven element for operating it, a pressure exerting means interposed between the driving element and the fly wheel for maintaining the driving element in frictional engagement with the driven element, a shiftable coupling mechanism for permanently connecting the driving element and fly wheel together whereby said element and fly wheel will revolve in unison, means for actuating said coupling mechanism for shifting the driving element out of frictional engagement with the driven element and against the action of said pressure exerting means, and means for actuating said coupling mechanism for shifting the driving element to increase the frictional engagement or bite between the driven element and the driving element to prevent slipping or skidding of the driven element with respect to the driving element.

5. A power transmission mechanism comprising a fly wheel driven from a prime mover, a driving element, and means permanently connected to the fly wheel and permanently connected to said driving element for shifting the latter longitudinally in either direction with respect to the former.

6. A power transmission mechanism comprising a fly wheel driven from a prime mover, a driving element, means permanently connected to the fly wheel and permanently connected to said driving element for shifting the latter longitudinally in either direction with respect to the former, a driven element, and a pressure exerting means interposed between the driving element and the fly wheel for maintaining the driving element in frictional contact with the driven element.

7. A power transmission mechanism comprising a fly wheel driven from a prime mover, a driving element, means permanently connected to the fly wheel and permanently connected to said driving element for shifting the latter longitudinally in either direction with respect to the former, a driven element, a pressure exerting means interposed between the driving element and the fly wheel for maintaining the driving element in frictional contact with the driven element, and means for operating said shifting means to separate the driving element from the driven element.

8. A power transmission mechanism comprising a fly wheel driven from a prime mover, a driving element, means permanently connected to the fly wheel and permanently connected to said driving element for shifting the latter longitudinally in either direction with respect to the former, a driven element, a pressure exerting means interposed between the driving element and the fly wheel for maintaining the driving element in frictional contact with the driven element, and means for actuating said shifting means to increase friction between the driving element and the driven element.

9. A power transmission mechanism comprising a fly wheel driven from a prime mover, a driving element, means permanently connected to the fly wheel and permanently connected to said driving element for shifting the latter longitudinally in either direction with respect to the former, a driven element, a pressure exerting means interposed between the driving element and the fly wheel for maintaining the driving element in frictional contact with the driven element, means for operating said shifting means to separate the driving element from the driven element, and means for actuating said shifting means to increase friction between the driving element and the driven element.

10. A frictional power transmission mechanism comprising a driving element, a fly wheel and a shiftable coupling mechanism connected with the fly wheel and with the driving element for permanently connecting the driving element to the fly wheel, said coupling mechanism when actuated adapted to longitudinally shift the driving element toward and away from the fly wheel.

11. A frictional power transmission mechanism comprising a driving element, a fly wheel and a shiftable coupling mechanism connected with the fly wheel and with the driving element for permanently connecting the driving element to the fly wheel, said coupling mechanism when actuated adapted to longitudinally shift the driving element toward and away from the fly wheel, and means for operating said coupling mechanism to shift the driving element from the fly wheel.

12. A frictional power transmission mechanism comprising a driving element, a fly wheel and a shiftable coupling mechanism connected with the fly wheel and with the driving element for permanently connecting the driving element to the fly wheel, said coupling mechanism when actuated adapted to longitudinally shift the driving element toward and away from the fly wheel, and means for operating said coupling mechanism to shift the driving element toward the fly wheel.

13. A frictional power transmission mechanism comprising a driving element, a fly wheel and a shiftable coupling mechanism connected with the fly wheel and with the driving element for permanently connecting the driving element to the fly wheel, said coupling mechanism when actuated adapted to longitudinally shift the driving element toward and away from the fly wheel, means for operating said coupling mechanism to shift the driving element toward the fly wheel, and means for operating said coupling mechanism to shift the driving element away from the fly wheel.

14. A frictional power transmission mechanism comprising a driving element, a fly wheel and a shiftable coupling mechanism connected with the fly wheel and with the driving element for permanently connecting the driving element to the fly wheel, said coupling mechanism when actuated adapted to longitudinally shift the driving element toward and away from the fly wheel, means for operating said coupling mechanism to shift the driving mechanism toward the fly wheel, a driven element, a resilient pressure exerting means interposed between the driving element and the fly wheel for maintaining the driving element in engagement with the driven element.

In testimony whereof I affix my signature, in presence of two witnesses.

MARTIN B. COVERT.

Witnesses:
N. LOUIS BOGAN,
J. FRED. KELLEY.

---

Copies of this patent may be obtained for five cents each, by addressing the "Commissioner of Patents, Washington, D. C."